US010173137B2

(12) United States Patent
Yamada et al.

(10) Patent No.: US 10,173,137 B2
(45) Date of Patent: Jan. 8, 2019

(54) COMPUTER-READABLE STORAGE MEDIUM HAVING DISPLAY CONTROL PROGRAM STORED THEREIN, DISPLAY CONTROL APPARATUS, DISPLAY CONTROL SYSTEM, AND DISPLAY CONTROL METHOD

(75) Inventors: Hiroyuki Yamada, Kyoto (JP); David Pollatsek, Northfield, MN (US)

(73) Assignee: Nintendo Co., Ltd., Kyoto (JP)

( * ) Notice: Subject to any disclaimer, the term of this patent is extended or adjusted under 35 U.S.C. 154(b) by 1662 days.

(21) Appl. No.: 13/085,780

(22) Filed: Apr. 13, 2011

(65) Prior Publication Data

US 2012/0178531 A1     Jul. 12, 2012

(30) Foreign Application Priority Data

Jan. 6, 2011 (JP) ................................ 2011-001414

(51) Int. Cl.
*A63F 13/50* (2014.01)
*A63F 13/52* (2014.01)
(Continued)

(52) U.S. Cl.
CPC .............. *A63F 13/52* (2014.09); *A63F 13/42* (2014.09); *A63F 13/50* (2014.09);
(Continued)

(58) Field of Classification Search
CPC ...... A63F 13/00; A63F 13/06; A63F 2300/64; A63F 2300/643; A63F 2300/66;
(Continued)

(56) References Cited

U.S. PATENT DOCUMENTS 6,165,073 A * 12/2000 Miyamoto ............. A63F 13/10
463/1
6,256,047 B1 * 7/2001 Isobe ...................... A63F 13/10
345/158
(Continued)

FOREIGN PATENT DOCUMENTS

| JP | 08-229239 | 9/1996 |
| JP | 2001-67490 | 3/2001 |
| JP | 2004-195002 | 7/2004 |

OTHER PUBLICATIONS

Tachyon: The Fringe Manual, NovaLogic, Microsoft Windows, Released Mar. 30, 2000.*
(Continued)

*Primary Examiner* — William H McCulloch, Jr.
*Assistant Examiner* — Chase Leichliter
(74) *Attorney, Agent, or Firm* — Nixon & Vanderhye, P.C.

(57) ABSTRACT

First, at least a player object and a non-player object are placed in a virtual three-dimensional space. Next, the player object is moved based on an input from predetermined operation means. Subsequently, current position data is obtained which indicates the current position, in the virtual three-dimensional space, of the player object which has been moved. Based on the current position data, the orientation of the non-player object is controlled such that a predetermined plane of the non-player object faces the current position of the player object.

20 Claims, 7 Drawing Sheets

(51) Int. Cl.
*A63F 13/42* (2014.01)
*A63F 13/803* (2014.01)
*A63F 13/537* (2014.01)
*A63F 13/5258* (2014.01)
*A63F 13/92* (2014.01)
*A63F 13/26* (2014.01)
*A63F 13/20* (2014.01)
*A63F 13/25* (2014.01)
*A63F 13/422* (2014.01)

(52) U.S. Cl.
CPC ........ *A63F 13/5258* (2014.09); *A63F 13/537* (2014.09); *A63F 13/803* (2014.09); *A63F 13/20* (2014.09); *A63F 13/25* (2014.09); *A63F 13/26* (2014.09); *A63F 13/422* (2014.09); *A63F 13/92* (2014.09); *A63F 2300/1075* (2013.01); *A63F 2300/204* (2013.01); *A63F 2300/301* (2013.01); *A63F 2300/6045* (2013.01); *A63F 2300/8017* (2013.01)

(58) Field of Classification Search
CPC ...... A63F 2300/6653; A63F 2300/8017; A63F 13/20; A63F 13/537; A63F 13/45; A63F 13/5258; A63F 13/25; A63F 13/42; A63F 13/422; A63F 13/50
USPC ........ 463/30–34, 36–38, 1–9; 345/419, 173; 434/29, 30, 37, 38
See application file for complete search history.

(56) References Cited

U.S. PATENT DOCUMENTS

| | | | |
|---|---|---|---|
| 6,532,015 B1 | 3/2003 | Hayashi | |
| 6,623,359 B1* | 9/2003 | Yotoriyama | A63F 13/10 463/36 |
| 6,835,136 B2* | 12/2004 | Kitao | A63F 13/10 463/33 |
| 6,972,756 B1* | 12/2005 | Yamamoto | 345/419 |
| 2001/0036852 A1* | 11/2001 | Shigeno | 463/4 |
| 2003/0112233 A1* | 6/2003 | Miida et al. | 345/419 |
| 2004/0209684 A1* | 10/2004 | Hisano | A63F 13/10 463/32 |
| 2006/0258449 A1* | 11/2006 | Yasui | G06T 13/20 463/31 |
| 2007/0194171 A1* | 8/2007 | Diamandis et al. | 244/10 |
| 2007/0262999 A1* | 11/2007 | Bridger | A63F 13/10 345/473 |
| 2009/0005139 A1* | 1/2009 | Morimoto | A63F 13/10 463/6 |
| 2009/0118003 A1* | 5/2009 | Okubo et al. | 463/31 |
| 2010/0004041 A1* | 1/2010 | Shindo | A63F 13/10 463/4 |
| 2011/0130201 A1* | 6/2011 | Nojiri | A63F 13/57 463/31 |

OTHER PUBLICATIONS

Sky Odyssey Manual, Activision and Sony Computer Entertainment for PlayStation 2, Released in North America Nov. 15, 2000.*
Pilotwings 64 Toriatsukai Setsumeisho (Instruction Manual of Pilotwings 64), Nintendo Co., Ltd., Jun. 23, 1996, p. 21, with a partial English translation.
64 Books 100 Percent Asobu Pilotwings 64 (64 Books—Play Pilotwings 64 to 100 Percent), Geibunsya Publishing Co., Ltd., Sep. 28, 1996, p. 54, with a partial English translation.

* cited by examiner

COMPUTER-READABLE STORAGE MEDIUM HAVING DISPLAY CONTROL PROGRAM STORED THEREIN, DISPLAY CONTROL APPARATUS, DISPLAY CONTROL SYSTEM, AND DISPLAY CONTROL METHOD

CROSS REFERENCE TO RELATED APPLICATION

The disclosure of Japanese Patent Application No. 2011-001414, filed on Jan. 6, 2011, is incorporated herein by reference.

BACKGROUND OF THE INVENTION

Field of the Invention

The present invention relates to display control that utilizes a virtual three-dimensional space, and more particularly to display control processing for flying a player object in a virtual three-dimensional space.

Description of the Background Art

Conventionally, there are known so-called flight simulation games. In a flight simulation game, a player operates and flies a player object (e.g., an airplane) in a virtual three-dimensional space, which allows the player to enjoy a feeling as if to be freely flying in the sky. However, simply flying in the sky (within the virtual space) lacks amusing game characteristics. Therefore, some attempts have been made to add amusing game characteristics. As one example, there is a game in which a player of the game acquires predetermined points by sequentially acquiring ring-shaped objects that are placed in the air. This adds amusing characteristics to the game (e.g., "Pilotwings 64 Toriatsukai Setsumeisho (Instruction Manual of Pilotwings 64)", Nintendo Co., Ltd., Jun. 23, 1996, p. 21; and "64 Books 100 Percent Asobu Pilotwings 64 (64 Books—Play Pilotwings 64 to 100 percent)", GEIBUNSYA PUBLISHING Co., Ltd., Sep. 28, 1996, p. 54).

In the above game, the player can acquire a ring by simply causing a player object to come into contact with the ring (in this game, when the player has acquired a ring, the player may be informed that the player object has "passed through" the ring). Since the game has the feature that the player is required to control the player object to come into contact with a ring to acquire the ring, the game's amusing characteristics are improved to some extent. However, the game, in which the player simply aims to fly the player object to the position of a ring for the purpose of acquiring the ring, is still monotonous and lacks variety. In this respect, the applicant of the present application discovered that there was still room for improvement which could be made, for example, by allowing a player to freely control a flying player object and perform more difficult flight operations (e.g., an operation of causing the player object to pass through a ring) with a moderate degree of difficulty (i.e., not too difficult and not too easy), thereby enhancing the amusement of the game.

SUMMARY OF THE INVENTION

Therefore, an object of the present invention is to provide a computer-readable storage medium having stored therein a novel display control program that provides amusing game characteristics with a moderate degree of difficulty and that allows a game player to enjoy the amusement of flying in the sky.

The present invention has the following features to attain the object mentioned above.

A computer-readable storage medium having a display control program stored therein, according to the present invention, stores a display control program that is to be executed by a computer of a display control apparatus for causing a player object to move in a virtual three-dimensional space. The display control program causes the computer to act as object placing means, movement control means, current position obtaining means, and orientation control means. The object placing means places at least a player object and a non-player object in the virtual three-dimensional space. The movement control means moves the player object based on an input from predetermined operation means. The current position obtaining means obtains current position data which indicates the current position, in the virtual three-dimensional space, of the player object which has been moved by the movement control means. The orientation control means causes, based on the current position data, a predetermined plane of the non-player object to face the current position of the player object.

According to the above configuration, the difficulty of operation of moving the player object toward the predetermined plane of the non-player object can be reduced.

As another configuration example, the object placing means may place at least one object having at least one predetermined plane as the non-player object in the virtual three-dimensional space, the non-player object allowing the player object to collide with or pass through the at least one predetermined plane. Also, the orientation control means may repeatedly update, based on the current position data, the orientation of the predetermined plane of the non-player object such that the predetermined plane always faces the current position of the player object.

According to the above configuration example, the difficulty of operation of causing the player object to collide with or pass through the non-player object can be reduced.

As another further configuration example, the predetermined plane may be an opening plane.

According to the above configurations, the difficulty of moving the player object toward the opening plane of the non-player object is reduced. This enhances the amusement of the game while keeping the difficulty of the game at a moderate level.

As another further configuration example, first collision detection may be set for an opening portion of the opening plane of the non-player object, and second collision detection may be set for a non-opening portion of the non-player object. The display control program may further cause the computer to act as: contact determination means for determining whether a contact of the player object with the non-player object has been detected by the first collision detection or the second collision detection; and display control means for performing, based on a result of the determining by the contact determination means, a first process in a case where the contact of the player object with the non-player object has been detected by the first collision detection and a second process in a case where the contact of the player object with the non-player object has been detected by the second collision detection, the first process and the second process being different from each other.

According to the above configuration example, different processes can be defined for a single non-player object, for example, as follows: points are added to the player if the player object comes into contact with the opening portion of the non-player object; and the player object is determined to have crashed if the player object comes into contact with, the non-opening portion of the non-player object.

As another further configuration example, the non-player object may be a ring-shaped object.

According to the above configuration example, the player is required to control the player object to pass through a ring. This enhances the amusement of the game but still keeps the difficulty of the game from becoming too high.

As another further configuration example, when the position of the non-player object satisfies a predetermined condition, the orientation control means may control the orientation of the non-player object such that the predetermined plane of the non-player object faces the current position of the player object.

According to the above configuration example, a processing load in relation to the control over the orientation of the non-player object can be reduced.

As another further configuration example, when the position of the non-player object is located within the viewing volume of a virtual camera, the orientation control means may control the orientation of the non-player object such that the predetermined plane of the non-player object faces the current position of the player object.

According to the above configuration example, the control over the orientation of the non-player object is performed only when necessary. This reduces a processing load.

A display control apparatus according to the present invention is an apparatus for causing a player object to move in a virtual three-dimensional space. The display control apparatus includes object placing means, movement control means, current position obtaining means, and orientation control means. The object placing means places at least a player object and a non-player object in the virtual three-dimensional space. The movement control means moves the player object based on an input from predetermined operation means. The current position obtaining means obtains current position data which indicates the current position, in the virtual three-dimensional space, of the player object which has been moved by the movement control means. The orientation control means causes, based on the current position data, a predetermined plane of the non-player object to face the current position of the player object.

A display control system according to the present invention is a system for causing a player object to move in a virtual three-dimensional space. The display control system includes object placing means, movement control means, current position obtaining means, and orientation control means. The object placing means places at least a player object and a non-player object in the virtual three-dimensional space. The movement control means moves the player object based on an input from predetermined operation means. The current position obtaining means obtains current position data which indicates the current position, in the virtual three-dimensional space, of the player object which has been moved by the movement control means. The orientation control means causes, based on the current position data, a predetermined plane of the non-player object to face the current position of the player object.

A display control method according to the present invention is a method for causing a player object to move in a virtual three-dimensional space. The display control method includes an object placing step, a movement control step, a current position obtaining step, and an orientation control step. The object placing step is a step of placing at least a player object and a non-player object in the virtual three-dimensional space. The movement control step is a step of moving the player object based on an input from predetermined operation means. The current position obtaining step is a step of obtaining current position data which indicates the current position, in the virtual three-dimensional space, of the player object which has been moved in the movement control step. The orientation control step is a step of causing, based on the current position data, a predetermined plane of the non-player object to face the current position of the player object.

According to the present invention, the difficulty of operation of moving the player object toward the predetermined plane of the non-player object can be reduced. This enhances the amusement of the game while keeping the difficulty of the game at a moderate level.

These and other objects, features, aspects, and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention is described with reference to the accompanying drawings. It should be noted that the present invention is not limited to the embodiment described below.

(Configuration of Game Apparatus)

Figure 1:
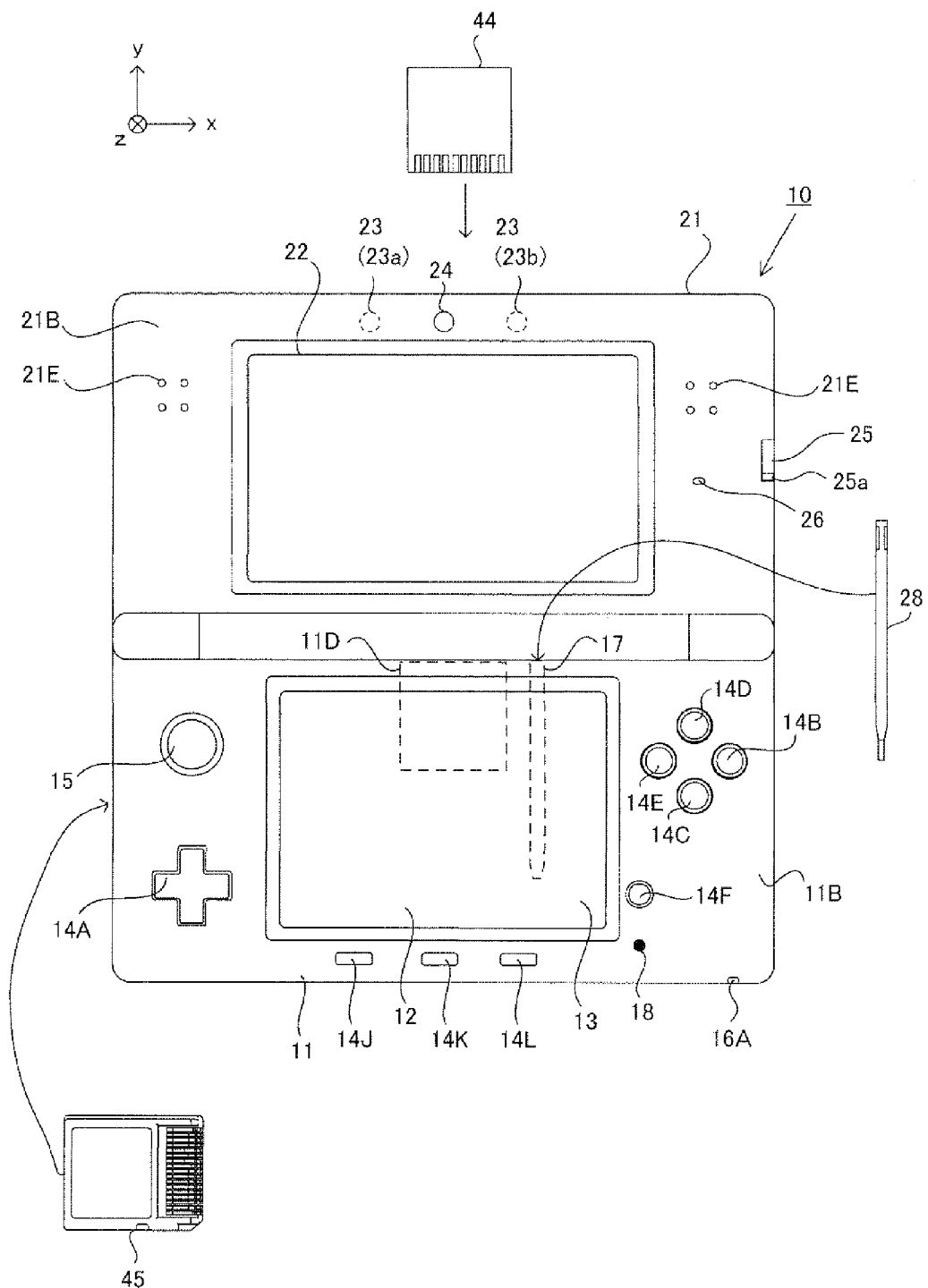
FIG. 1 is a front view a game apparatus 10 in an opened state.

Hereinafter, a game apparatus according to one embodiment of the present invention will be described. FIG. 1 and FIG. 2A to 2D are each a plan view showing an outer appearance of a game apparatus 10. The game apparatus 10 is a hand-held game apparatus, and is configured to be foldable as shown in FIG. 1 and FIG. 2A to 2D. FIG. 1 shows the game apparatus 10 in an opened state, and FIG. 2A to 2D show the game apparatus 10 in a closed state. FIG. 1 is a front view of the game apparatus 10 in the opened state. The game apparatus 10 is capable of capturing an image by means of an imaging section, displaying the captured image on a screen, and storing data of the captured image. The game apparatus 10 is also capable of executing a game program that is stored in an exchangeable memory card or a game program that is received from a server or another game apparatus, and displaying on the screen an image generated by computer graphics processing, such as an image captured by a virtual camera set in a virtual space.

Initially, an external structure of the game apparatus 10 will be described with reference to FIG. 1 and FIG. 2A to FIG. 2D. The game apparatus 10 includes a lower housing 11 and an upper housing 21 as shown in FIG. 1 and FIG. 2A to FIG. 2D. The lower housing 11 and the upper housing 21 are connected to each other so as to be openable and closable (i.e., foldable).

(Description of Lower Housing)

Initially, a structure of the lower housing 11 will be described. As shown in FIG 1 and FIG. 2A to 2D, the lower housing 11 includes a lower LCD (Liquid Crystal Display) 12, a touch panel 13, operation buttons 14A to 14L, an analog stick 15, an LED 16A and an LED 16B, an insertion opening 17, and a microphone hole 18. Hereinafter, these components will be described in detail.

As shown in FIG. 1, the lower LCD 12 is accommodated in the lower housing 11. The number of pixels of the lower LCD 12 may be, for example, 320 dots×240 dots (the horizontal line×the vertical line). The lower LCD 12 is a display device for displaying an image in a planar manner (not in a stereoscopically visible manner), which is different from an upper LCD 22 described below. Although an LCD is used as a display device in the present embodiment, any other display device such as a display device utilizing EL (Electro Luminescence) may be used, for example. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, a resistive film type touch panel is used as the touch panel 13. However, the touch panel 13 is not limited to a resistive film type touch panel, but may be any type of touch panel. For example, a touch panel of electrostatic capacitance type may be used as the touch panel 13. In the present embodiment, the touch panel 13 has the same resolution (detection accuracy) as that of the lower LCD 12. However, the resolution of the touch panel 13 and the resolution of the lower LCD 12 need not be the same. The insertion opening 17 (indicated by dashed lines in FIG. 1 and FIG. 2D) is provided in the upper side surface of the lower housing 11. The insertion opening 17 may be used for accommodating a stylus pen 28 which is used for performing an operation on the touch panel 13. Although an input on the touch panel 13 is usually performed by using the stylus pen 28, a finger of a user may be used for performing an input on the touch panel 13, in addition to the stylus pen 28.

The operation buttons 14A to 14L are each an input device for performing a predetermined input. As shown in FIG. 1, among the operation buttons 14A to I4L, a cross button 14A (a direction input button 14A), a button 14B, a button 14C, a button 14D, a button 14E, a power button 14F, a selection button 14J, a HOME button 14K, and a start button 14L are provided at the inner side surface (the main surface) of the lower housing 11. The cross button 14A is cross-shaped, and includes buttons for indicating up, down, left, right directions. The buttons 1, 4A to 14E, the selection button 14J, the HOME button 14K, and the start button 14L are assigned respective functions, as necessary, in accordance with a program executed by the game apparatus 10. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a keytop which is configured to slide parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object moves in a direction in which the keytop of the analog stick 15 is slid. It should be noted that any component that enables an analog input by being tilted by a predetermined amount in any direction among up, down, left, right, and diagonal directions may be used as the analog stick 15.

Further, the microphone hole 18 is provided in the inner side surface of the lower housing 11. Under the microphone hole 18, a microphone 42 (see FIG. 3), which will be described below, is provided as a sound input device, and the microphone 42 detects a sound from the outside of the game apparatus 10.

Figure 2:
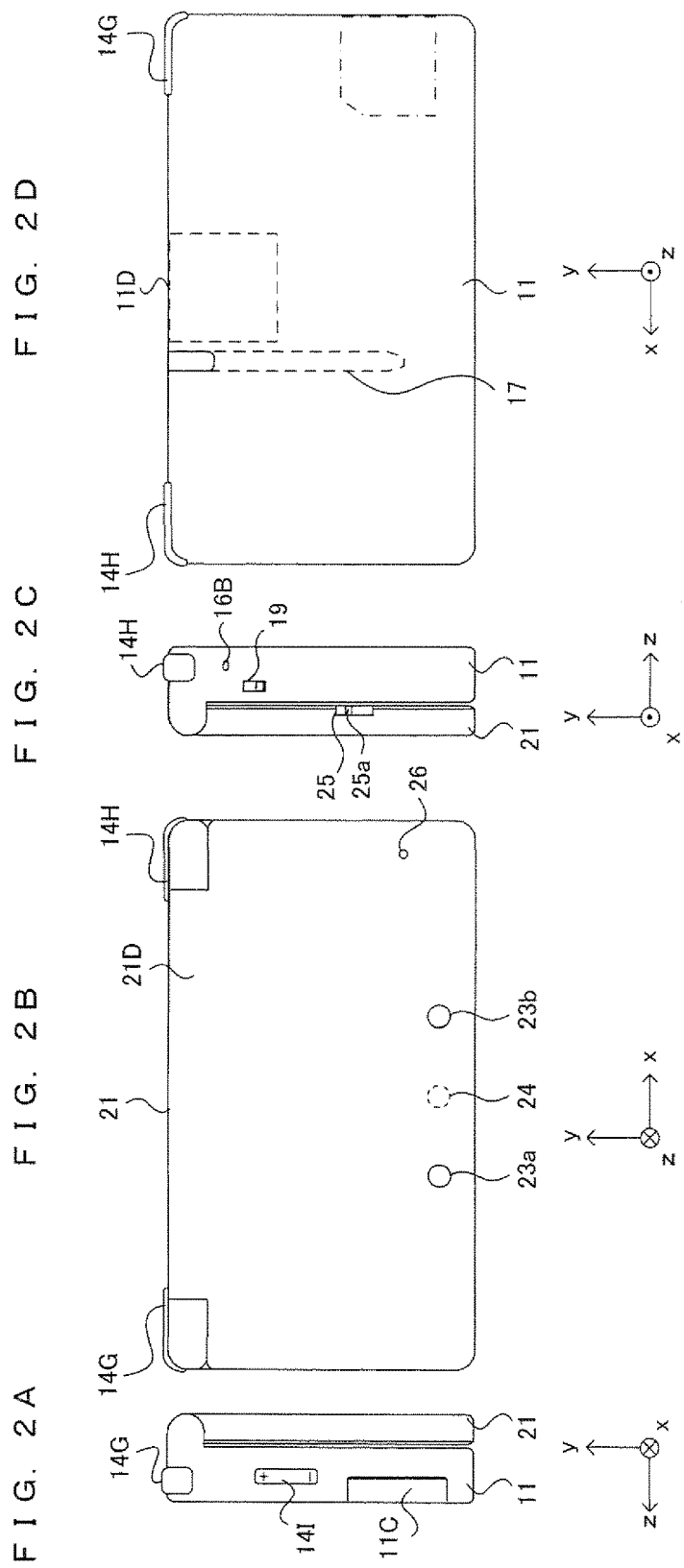
FIG. 2A to 2D show a left side view, a front view, a right side view, and a rear view of the game apparatus 10 in a closed state.

FIG. 2A is a left side view of the game apparatus 10 in the closed state. FIG. 2B is a front view of the game apparatus 10 in the closed state. FIG. 2C is a right side view of the game apparatus 10 in the closed state. FIG. 2D is a rear view of the game apparatus 10 in the closed state. As shown in FIG. 2B and FIG. 2D, an L button 14G and an R button 14H are provided at the upper side surface of the lower housing 11. The L button 14G and the R button 14H can act as as shutter buttons (image capturing instruction buttons) of the imaging section, for example. Further, as shown in FIG. 2A, a sound volume button 14I is provided at the left side surface of the lower housing 11. The sound volume button 14I is used for adjusting the sound volume of a speaker of the game apparatus 10.

As shown in FIG. 2A, a cover 11C is provided at the left side surface of the lower housing 11 in an openable and closable manner. Inside the cover 11C, a connector (not shown) is provided for electrically connecting between the game apparatus 10 and an external data storage memory 45. The external data storage memory 45 is detachably attached to the connector. The external data storage memory 45 is used for, for example, saving (storing) data of an image captured by the game apparatus 10.

As shown in FIG. 2D, an insertion opening 11D, through which an external memory 44 having a game program stored therein is inserted, is provided at the upper side surface of the lower housing 11. A connector (not shown) for electrically connecting between the game apparatus 10 and the external memory 44 in a detachable manner is provided inside the insertion opening 11D. A predetermined game program is executed when the external memory 44 is connected to the game apparatus 10.

As shown in FIG. 1 and FIG. 2C, a first LED 16A for notifying the user of the power ON/OFF state of the game apparatus 10 is provided at the lower side surface of the lower housing 11, and a second LED 16B for notifying the user whether wireless communication of the game apparatus 10 is currently established is provided at the right side surface of the lower housing 11. The game apparatus 10 is capable of performing wireless communication with other devices, and the second LED 16B is lit up while the wireless communication is established. The game apparatus 10 has a function of connecting to a wireless LAN by a method compliant with, for example, IEEE 802.11b/g standard. A wireless switch 19 for enabling/disabling the wireless communication function is provided at the right side surface of the lower housing 11 (see FIG. 2C).

A rechargeable battery (not shown) which is the power source for the game apparatus 10 is accommodated in the lower housing 11, and the battery can be charged through a terminal provided at a side surface (for example, the upper side surface) of the lower housing 11.

(Description of Upper Housing)

Next, a structure of the upper housing 21 will be described. As shown in FIG. 1 and FIG. 2A to 2D, the upper housing 21 includes the upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26. Hereinafter, theses components will be described in detail.

As shown in FIG. 1, the upper LCD 22 is accommodated in the upper housing 21, The number of pixels of the upper LCD 22 may be, for example, 800 dots×240 dots (the horizontal line×the vertical line). Although in the present embodiment the upper LCD 22 is a liquid crystal display device, a display device utilizing EL (Electro Luminescence) or the like may be used instead. In addition, a display device having any resolution may be used as the upper LCD 22.

The upper LCD 22 is a display device capable of displaying a stereoscopically visible image. In the present embodiment, an image for left eye and an image for right eye are displayed by using substantially the same display area. Specifically, the upper LCD 22 may be a display device using a method in which the image for left eye and the image for right eye are alternately displayed in the horizontal direction in predetermined units (for example, every other line). Alternatively, a display device using a method in which the image for left eye and the image for right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used for enabling the image for left eye and the image for right eye, which are alternately displayed in the horizontal direction, to be separately viewed by the left eye and the right eye, respectively. In the present embodiment, the upper LCD 22 of a parallax barrier type is used. The upper LCD 22 displays, by using the image for right eye and the image for left eye, an image (a stereoscopic image) which is stereoscopically visible with naked eyes. That is, the upper LCD 22 allows a user to view, by means of a parallax barrier, the image for left eye with the user's left eye and the image for right eye with the user's right eye. In this manner, a stereoscopic image (a stereoscopically visible image) exerting a stereoscopic effect for the user can be displayed. Further, the upper LCD 22 may disable the parallax barrier. When the parallax barrier is disabled, an image can be displayed in a planar manner (i.e., it is possible to display an image not in the above-described stereoscopically visible manner but in a planarly visible manner; specifically, a display mode is used in which the same displayed image is viewed by both left and right eyes). Thus, the upper LCD 22 is a display device capable of switching between a stereoscopic display mode for displaying a stereoscopically visible image and a planar display mode for displaying an image in a planar manner (i.e., for displaying a planarly visible image). The switching of the display mode is performed by the 3D adjustment switch 25, which will be described below.

Two imaging sections (23a and 23b) provided at the outer side surface (the back surface reverse of the main surface at which the upper LCD 22 is provided) 21D of the upper housing 21 are collectively referred to as the outer imaging section 23. Both directions in which the outer imaging section (left) 23a and the outer imaging section (right) 23b capture images, respectively, extend outward from the outer side surface 21D and are both normal to the outer side surface 21D. The outer imaging section (left) 23a and the outer imaging section (right) 23b can be used as a stereo camera in accordance with a program executed by the game apparatus 10. Each of the outer imaging section (left) 23a and the outer imaging section (right) 23b includes an imaging device (such as a CCD image sensor or a CMOS image sensor) having the same predetermined resolution, and a lens. The lens may have a zooming mechanism.

The inner imaging section 24 is provided at the inner side surface (the main surface) 21B of the upper housing 21, and acts as an imaging section which captures an image in a direction that extends inward from and normal to the inner side surface. The inner imaging section 24 includes an imaging device (such as a CCD image sensor and a CMOS image sensor) having a predetermined resolution, and a lens. The lens may have a zooming mechanism.

The 3D adjustment switch 25 is a slide switch, and is used for switching the display mode of the upper LCD 22 as described above. Further, the 3D adjustment switch 25 is used for adjusting the stereoscopic effect of a stereoscopically visible image (stereoscopic image) that is displayed on the upper LCD 22. The 3D adjustment switch 25 has a slider 25a which is slidable to any position in a predetermined direction (in the longitudinal direction along the right side surface), and the display mode of the upper LCD 22 is set, or the appearance of a displayed stereoscopic image is adjusted, in accordance with the position of the slider 25a. To be specific, the amount of positional discrepancy between the image for right eye and the image for left eye with respect to the horizontal direction is adjusted in accordance with the position of the slider 25a.

The 3D indicator 26 indicates whether the upper LCD 22 is in the stereoscopic display mode. The 3D indicator 26 is an LED, and is lit up when the stereoscopic display mode of the upper LCD 22 is enabled. The 3D indicator 26 may be lit up only in a case where program processing for displaying a stereoscopically visible image is performed when the upper LCD 22 is in the stereoscopic display mode.

Further, speaker holes 21E are formed in the inner side surface of the upper housing 21. A sound from a below-described speaker 43 is outputted through the speaker holes 21E.

(Internal Configuration of Game Apparatus 10)

Figure 3:
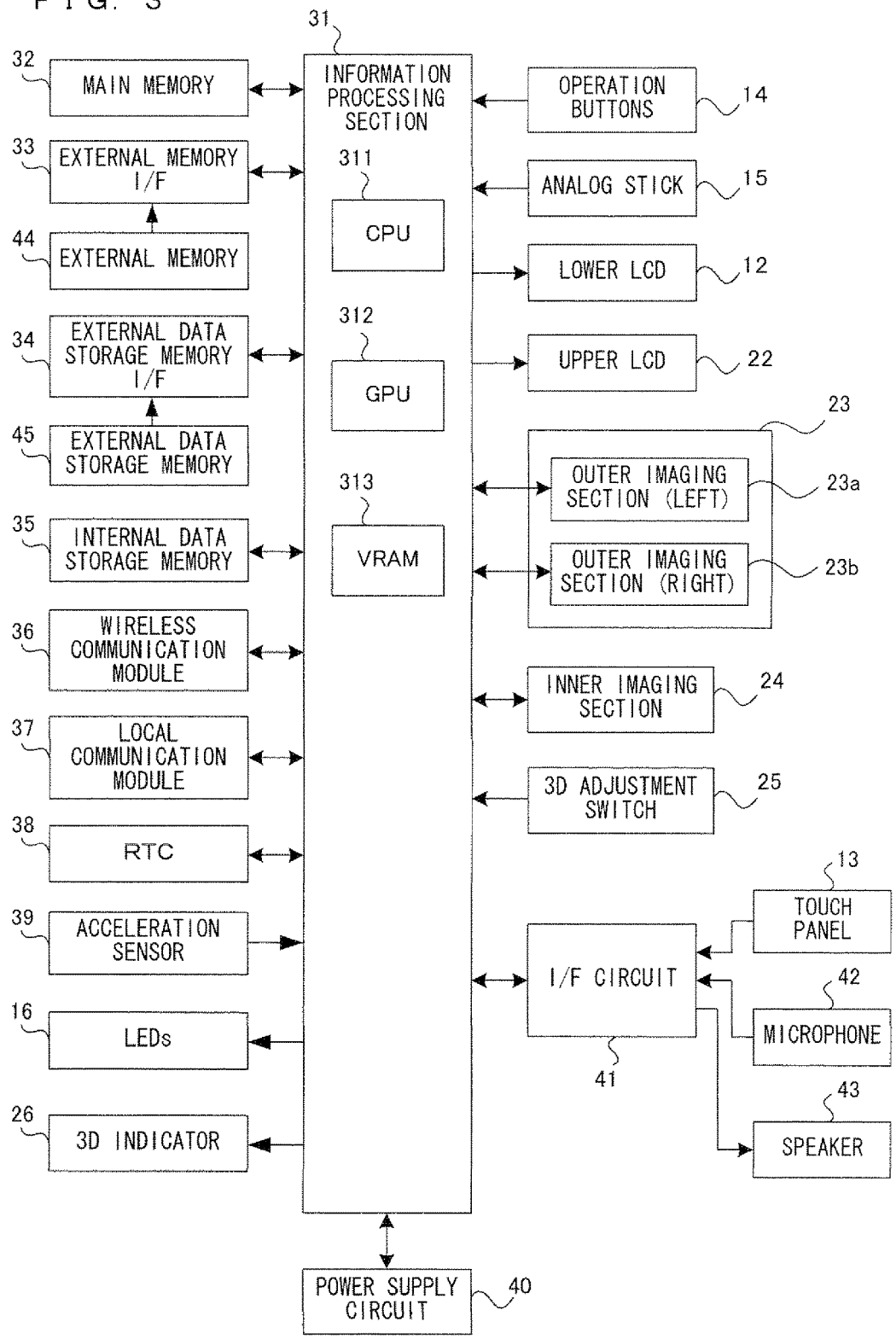
FIG. 3 is a block diagram showing an internal configuration of the game apparatus 10.

Next, an internal electrical configuration of the game apparatus 10 will be described with reference to FIG. 3. FIG. 3 is a block diagram showing an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit board, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby performing processing in accordance with the program. The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

The main memory 32, the external memory I/F 33, the external data storage memory I/F 34, and the internal data storage memory 35 are connected to the information processing section 31. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the aforementioned processing based on a program, and temporarily stores a program obtained from the outside (i.e., from the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is structured as, for example, a read-only semiconductor memory. When the external memory 44 is connected to the external memory I/F 33, the information processing section 31 can load a program stored in the external memory 44. Predetermined processing is performed when the program loaded by the information processing section 31 is executed. The external data storage memory 45 is structured as a non-volatile readable and writable memory (for example, a NAND flash memory), and is used for storing predetermined data. For example, images captured by the outer imaging section 23 and/or images captured by another device are stored in the external data storage memory 45. When the external data storage memory 45 is connected to the external data storage memory I/F 34, the information processing section 31 can load an image stored in the external data storage memory 45, and display the image on the upper LCD 22 and/or the lower LCD 12.

The internal data storage memory 35 is structured as a non-volatile readable and writable memory (for example, a NAND flash memory), and is used for storing predetermined data. For example, data and/or programs downloaded via the wireless communication module 36 by wireless communication are stored in the internal data storage memory 35.

The wireless communication module 36 has a function of connecting to a wireless LAN by a method compliant with, for example, IEEE 802.11b/g standard, The local communication module 37 has a function of performing wireless communication with the same type of game apparatus by a predetermined communication method (for example, communication based on a unique protocol or infrared communication). The wireless communication module 36 and the local communication module 37 are connected to the information processing section 31. The information processing section 31 can perform data transmission to and data reception from another device via the Internet by using the wireless communication module 36, and perform data transmission to and data reception from the same type of another game apparatus by using the local communication module 37.

The acceleration sensor 39 is connected to the information processing section 31. The acceleration sensor 39 detects magnitudes of acceleration (linear acceleration) in the directions of respective straight lines along three axes (xyz axes). The acceleration sensor 39 is provided inside the lower housing 11. In the acceleration sensor 39, as shown in FIG. 1, the direction along the longer sides of the lower housing 11 is defined as an x-axial direction, the direction along the shorter sides of the lower housing 11 is defined as a y-axial direction, and the direction perpendicular to the inner side surface (the main surface) of the lower housing 11 is defined as a z-axial direction. The acceleration sensor 39 detects the magnitudes of linear acceleration in the respective axial directions. The acceleration sensor 39 is, for example, an electrostatic capacitance type acceleration sensor. However, another type of acceleration sensor may be used. The acceleration sensor 39 may be an acceleration sensor for detecting the magnitude of acceleration in one axial direction or two-axial directions. The information processing section 31 is capable of detecting the orientation and motion of the game apparatus 10 by receiving data (acceleration data) that indicates acceleration detected by the acceleration sensor 39.

The RTC 38 and the power supply circuit 40 are connected to the information processing section 31. The RTC 38 counts time, and outputs the time to the information processing section 31. The information processing section 31 calculates the current time (date) based on the time counted by the RTC 38. The power supply circuit 40 controls power from the power source (i.e., the rechargeable battery accommodated in the lower housing 11 as described above) of the game apparatus 10, and supplies the power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice uttered by a user, and outputs a sound signal to the I/F circuit 41, accordingly. The amplifier amplifies a sound signal from the I/F circuit 41, and a resultant sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. For example, the sound control circuit performs AID conversion and D/A conversion on sound signals, and also converts sound signals into a predetermined form of sound data. The touch panel control circuit generates a predetermined form of touch position data based on a signal outputted from the touch panel 13, and outputs the touch position data to the information processing section 31. The touch position data indicates coordinates of a position, on an input surface of the touch panel 13, at which an input has been performed. The touch panel control circuit reads a signal outputted from the touch panel 13 and generates touch position data once in every predetermined period. The information processing section 31 obtains the touch position data to recognize a position, on the touch panel 13, at which an input has been performed.

Operation buttons 14 include the above-described operation buttons 14A to 14L, and are connected to the information processing section 31. The operation buttons 14 output, to the information processing section 31, operation data indicating input states of the respective operation buttons 14A to 14L (i.e., indicating whether the operation buttons 14A to 14L have been pressed). The information processing section 31 obtains the operation data from the operation buttons 14 to perform processing in accordance with the inputs performed via the operation buttons 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (i.e., a stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for right eye and an image for left eye, which are stored in the VRAM 313 of the information processing section 31, are outputted to the upper LCD 22. More specifically, the LCD controller alternately repeats reading of pixel data of the image for right eye for one line in the vertical direction, and reading of pixel data of the image for left eye for one line in the vertical direction, thereby reading, from the VRAM 313, the image for right eye and the image for left eye. Thus, an image to be displayed is divided into images for right eye and images for left eye, each of which is a rectangle-shaped image having one line of pixels aligned in the vertical direction. Then, an image, in which the rectangle-shaped images for right eye that are obtained through the division and the rectangle-shaped images for left eye that are obtained through the division are alternately arranged, is displayed on the screen of the upper LCD 22. A user views the image through the parallax barrier in the upper LCD 22, so that the images for right eye are viewed by the user's right eye and the images for left eye are viewed by the user's left eye. In this manner, a stereoscopically visible image is displayed on the screen of the upper LCD 22.

The outer imaging section 23 and the inner imaging section 24 are connected to the information processing section 31. The outer imaging section 23 and the inner imaging section 24 each capture an image in accordance with an instruction from the information processing section 31, and output data of the captured image to the information processing section 31.

The 3D adjustment switch 25 is connected to the information processing section 31. The 3D adjustment switch 25 transmits, to the information processing section 31, an electrical signal in accordance with the position of the slider 25*a*.

The 3D indicator 26 is connected to the information processing section 31. The information processing section 31 controls lighting-up of the 3D indicator 26. For example, the information processing section 31 lights up the 3D indicator 26 when the upper LCD 22 is in the stereoscopic display mode. The game apparatus 10 has the internal configuration as described above.

Figure 4:
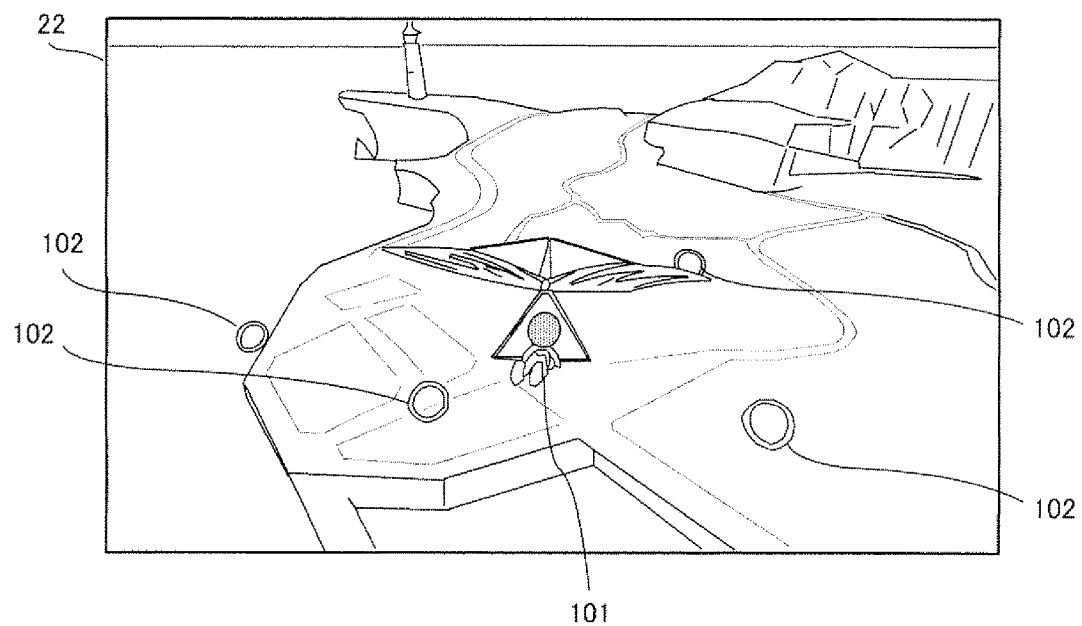
FIG. 4 shows an example of a game screen image assumed in an embodiment of the present invention.
Figure 5:
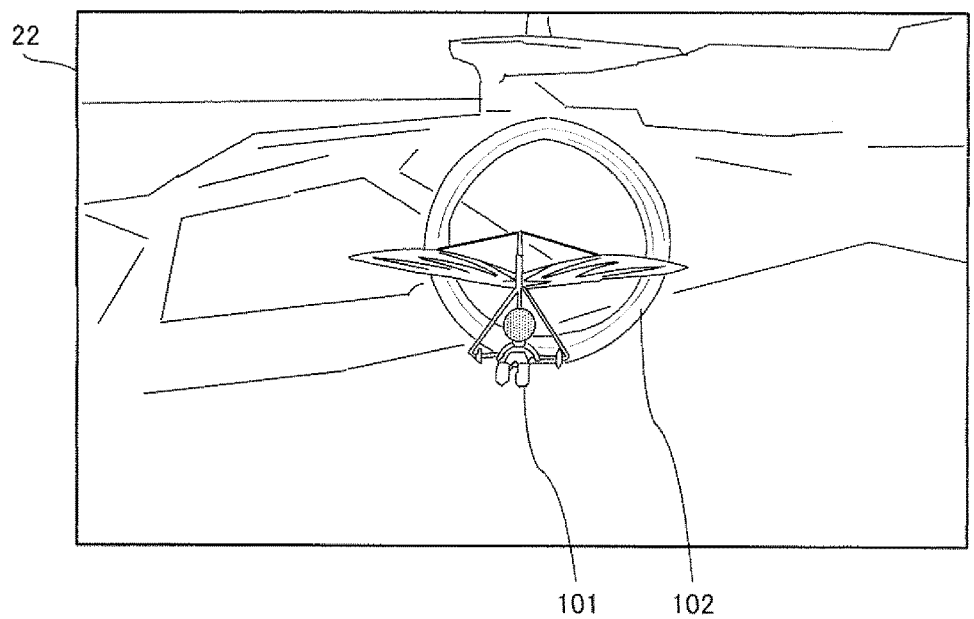
FIG. 5 shows an example of a game screen image assumed in the embodiment of the present invention.
Figure 6:
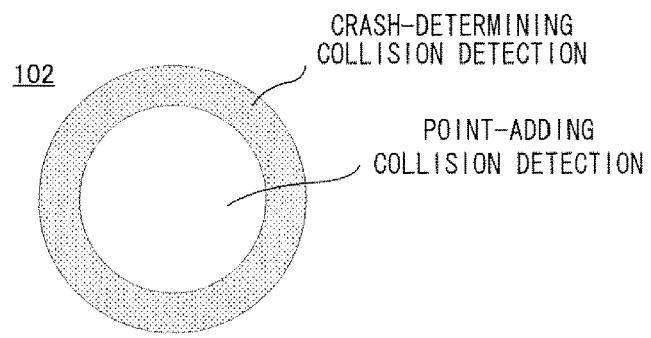
FIG. 6 illustrates collision detection against a ring object.

Next, a game assumed in the present embodiment is briefly described with reference to FIG. 4 to FIG. 6. The game assumed in the present embodiment is a flight simulation game for hang gliding. FIG. 4 and FIG. 5 show examples of game screen images assumed in the present embodiment (these screen images may be displayed in a stereoscopically visible manner). FIG. 4 shows a virtual game space, which is a virtual three-dimensional space. FIG. 4 shows a player object 101 flying with a hang glider, which is seen from the back. In this game, a virtual camera is basically placed at the back of the player object 101. The virtual camera is controlled to follow the player object 101. In the game assumed in the present embodiment, which uses these game screen images, the player object 101 is moved based on operations performed by a player. This allows the player to enjoy a feeling as if to be flying around with the hang glider. This game realizes simulated maneuverability of the hang glider and sense of gliding through the sky. To be specific, the maneuverability is such that when the player attempts to change the moving direction of the player object, the player object does not promptly respond to the player's operation input (in particular, to the player's operation of specifying the moving direction of the player object). For example, when the player attempts to change the flying direction of the player object 101 to the right, the player object 101 takes some time to turn to the right (that is, the maneuverability causes some frustration for the player).

As shown in FIG. 4, a plurality of ring objects 102 are displayed in the virtual game space. In this game, as shown in FIG. 5, the player causes the player object 101 to pass through the ring objects 102, thereby acquiring points. However, if the player object 101 collides with the body of a ring object 102, the player object 101 is determined to have crashed. FIG. 6 is a schematic diagram showing a front view of a ring object 102. As shown in FIG. 6, two types of collision detection are set for the ring object 102. The first type of collision detection is collision detection against the body of the ring object 102 (hereinafter referred to as "crash-determining collision detection"), and the second type of collision detection is collision detection against the inner-ring portion of the ring object 102 (hereinafter, referred to as "point-adding collision detection") (It should be noted that the point-adding collision detection is set as collision detection against a transparent portion). That is, an object used for collision detection for a collision detection result "success" and an object used for collision detection for a collision detection result "failure" are integrated (i.e., these objects are placed adjacent to each other) and defined as the ring object 102.

In such a case where the player acquires points when the player object passes through the ring object 102, there is a concern as described below. Assume a case where the orientation of the ring object 102 is fixed while the player object 101 is allowed to move freely within the virtual game space. In such a case, for example, if the player object 101 approaches the ring object 102 from the side, the player object 101 crashes because the player object 101 cannot pass through the ring object 102 from the side. In other words, the player is always required to control the player object to be in such a position as to allow the player object to approach the ring object 102 from the front (or from the back). This may result in the game being too difficult for the player.

Accordingly, in the present embodiment, the orientation of each ring object 102 is controlled such that the front side of the ring object 102 always faces the current position of the player object 101 (or such that a period during which the front side of the ring object 102 faces the current position of the player object 101 is longer than a period during which the front side of the ring object 102 does not face the current position of the player object 101). In this manner, the difficulty of the game is kept at a moderate level. Specifically, first, ring objects 102 that are located within the viewing volume of the virtual camera are detected. Subsequently, the orientation of each detected ring object 102 is controlled as necessary such that the front plane of the ring object 102 (i.e., the plane that allows the player object 101 to pass through the ring object 102; hereinafter, referred to as an opening plane) faces the midpoint of the player object 101, and then the ring object 102 is rendered. It should be noted that each ring object 102 in the present embodiment has two opening planes at the front and at the back, respectively. However, in the present embodiment, only the front opening plane of each ring object 102 is predefined as the opening plane, and the orientation of each ring object 102 is controlled with reference to the facing direction of the opening plane (however, as an alternative, each ring object 102 may be controlled such that the back opening plane of the ring object 102 faces in the direction of the player object 101, because the shape of the ring object 102 allows the same effect to be obtained with the back opening plane).

Figure 7:
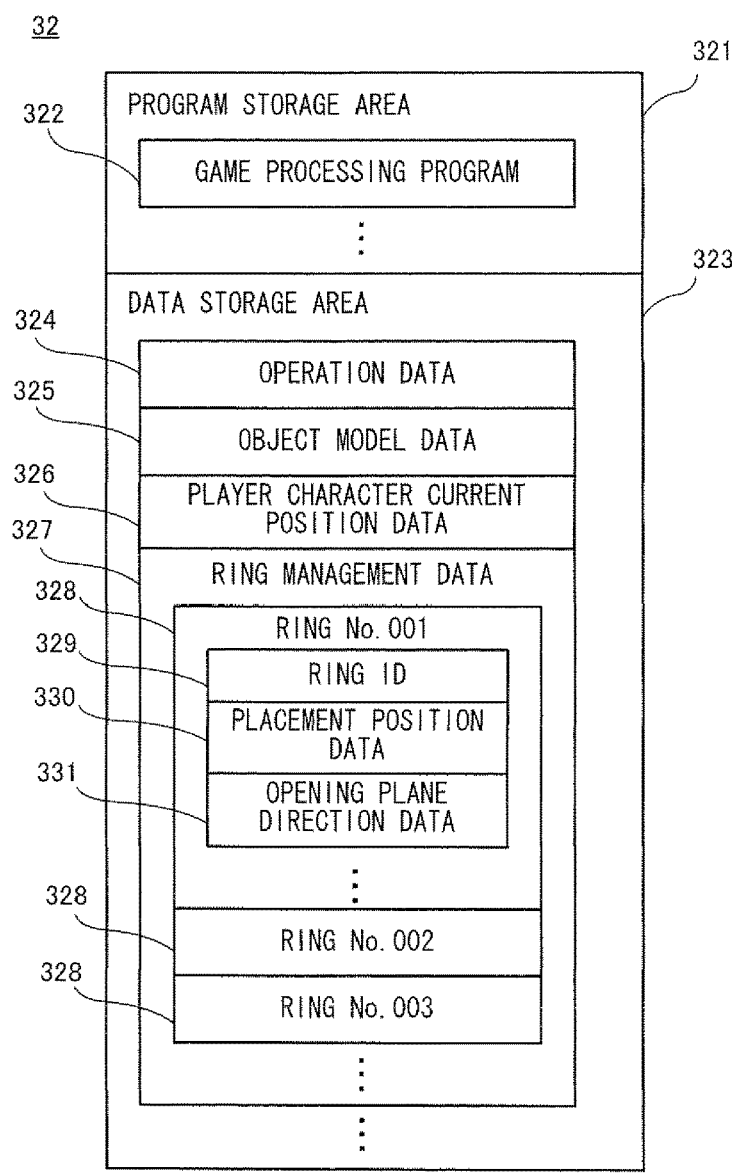
FIG. 7 shows a memory map of a main memory 32.

Next, game processing performed by the game apparatus 10 will be described in detail. First, a description is given of data that is stored in the main memory 32 when the game processing is performed. FIG. 7 shows a memory map of the main memory 32 of the game apparatus 10. As shown in FIG. 7, the main memory 32 includes a program storage area 321 and a data storage area 323. Data to be stored in the program storage area 321 and data to be stored in the data storage area 323 are originally stored in the external memory 44. At the time of executing a game program, these data are transferred to and stored in the main memory 32.

It should be noted that these program and data may be provided not only from the external memory 44 but also from a storage medium such as a magneto-optical disk, memory card, or hard disk. Moreover, these program and data may be obtained by downloading from a predetermined server or game apparatus via a wired or wireless network (i.e., the downloaded program and data may be stored in the main memory 32).

The program storage area 321 stores a game processing program 322 which is executed by the CPU 311.

The data storage area 323 stores data such as operation data 324, object model data 325, player character current position data 326, and ring management data 327. The data storage area 323 also stores various flags that are used during game processing.

The operation data 324 indicates operations which the player has performed on the game apparatus 10. The operation data 324 contains: touch coordinate data which indicates touch coordinates detected by the touch panel 13; operation button data which indicates whether the operation buttons 14 have been pressed; and analogue input data which indicates whether an input has been performed via the analog stick 15.

The object model data 325 contains polygon model data and texture image data of various objects such as the player object 101 and the ring objects 102. The object model data 325 also contains polygon model data and texture image data of other various objects that are components of the virtual game space such as topography objects and building objects.

The player character current position data 326 indicates the current position of the player object 101 in the virtual game space. In the present embodiment, the current position of the player object 101 is represented by three-dimensional coordinates.

The ring management data 327 manages the ring objects 102. The ring management data 327 contains management data 328 associated with the ring objects 102. The management data 328 of each ring object 102 contains a ring ID 329, placement position data 330, opening plane direction data 331, and the like.

In the management data 328 of each ring object 102, the ring ID 329 uniquely identifies the ring object 102; the placement position data 330 indicates a position, in the virtual game space, at which the ring object 102 is placed; and the opening plane direction data 331 indicates a direction, in the virtual game space, in which the opening plane of the ring object 102 is currently facing. The opening plane direction data 331 is, in other words, data indicating the current orientation of the ring object 102.

Figure 8:
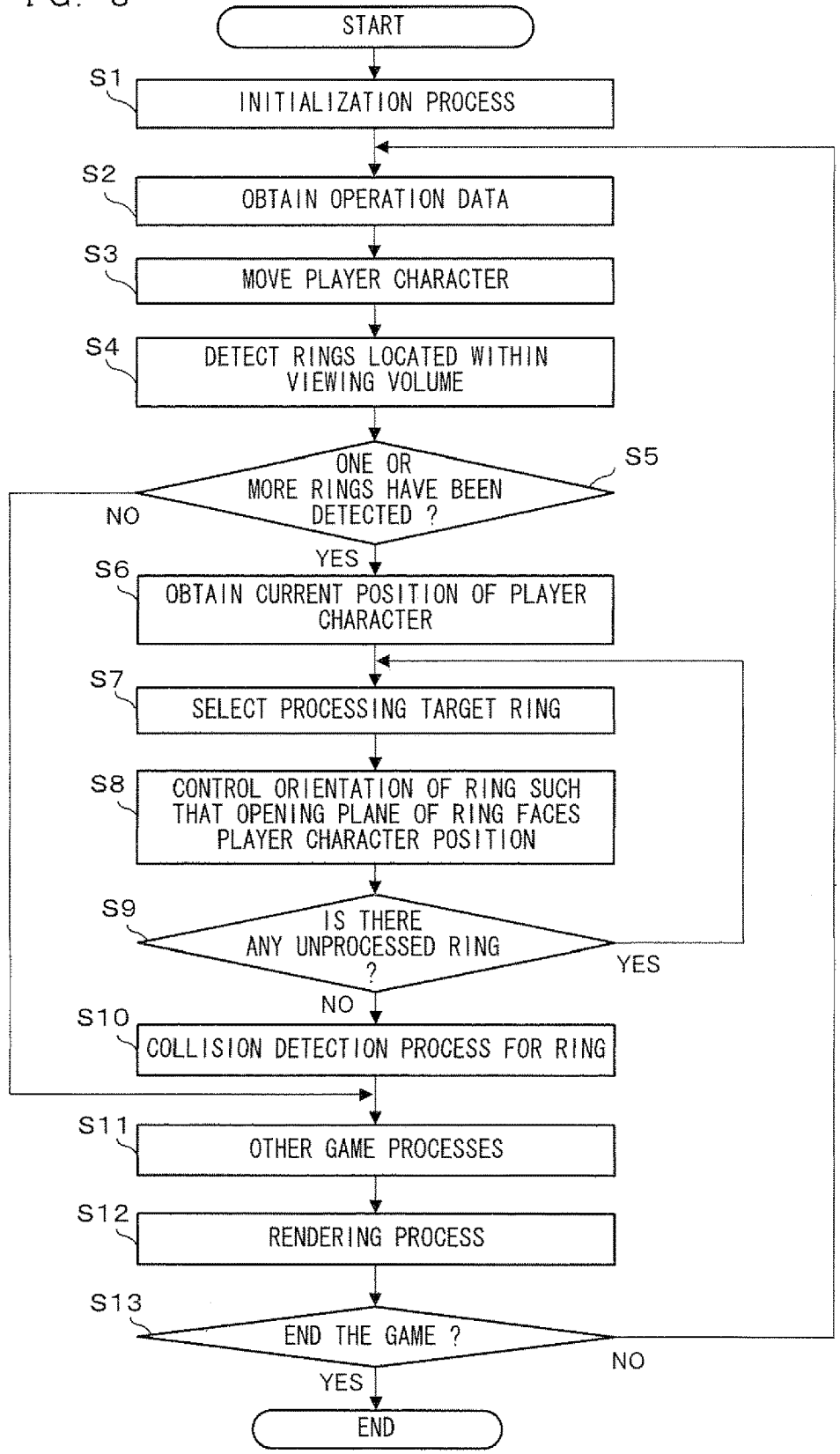
FIG. 8 is a flowchart showing the details of game processing according to the embodiment of the present invention.

Next, the flow of game processing performed by the game apparatus 10 is described with reference to FIG. 8. FIG. 8 is a flowchart showing the details of the game processing performed by the game apparatus 10. When the game apparatus 10 is powered on, the CPU 311 of the game apparatus 10 executes a boot program stored in a boot ROM (not shown), thereby initializing each unit of the game apparatus such as the main memory 32. Then, a game program stored in the external memory 44 is loaded into the main memory 32 and the game program starts to be executed.

It should be noted that the description below with reference to the flowchart of FIG. 8 mainly describes processing that relates to the control over the ring objects 102. In the description below, the details of other processing that is not directly related to the present invention are omitted.

First, an initialization process is performed at step S1. To be specific, topography objects and the like are generated and the arrangement of these objects in a virtual game space is determined, as necessary, and the virtual game space is created as the setting of the game. Then, the ring objects 102 are generated. Next, referring to the ring management data 327, the ring objects 102 are placed in the virtual game space based on pieces of placement position data 330 that are associated with the respective ring objects 102, Subsequently, the player object 101 is generated and placed at a predefined initial position. A game image that shows the virtual game space created in the above manner is generated and displayed on the upper LCD 22. Thereafter, the processing loop from step S2 to S13 is repeated every frame, and thus the game advances.

Next, the operation data 324 is obtained at step S2. At the next step S3, a process of moving the player object 101 is performed based on the operation data 324, and also, the player character current position data 326 is updated with data that indicates the position of the player object 101 which has been moved.

Next, at step S4, the ring objects 102 that are located within the viewing volume of the virtual camera are detected. Thereafter, at step S5, it is determined from the detection result whether one or more ring objects 102 have been detected. If no ring object 102 is detected (NO at step S5), the processing proceeds to step S11, which will be described below.

On the other hand, if one or more ring objects 102 are detected (YES at step S5), then at step S6, the player character current position data 326 is referred to and thereby the current position of the player object 101 within the virtual game space is obtained.

Figure 9:
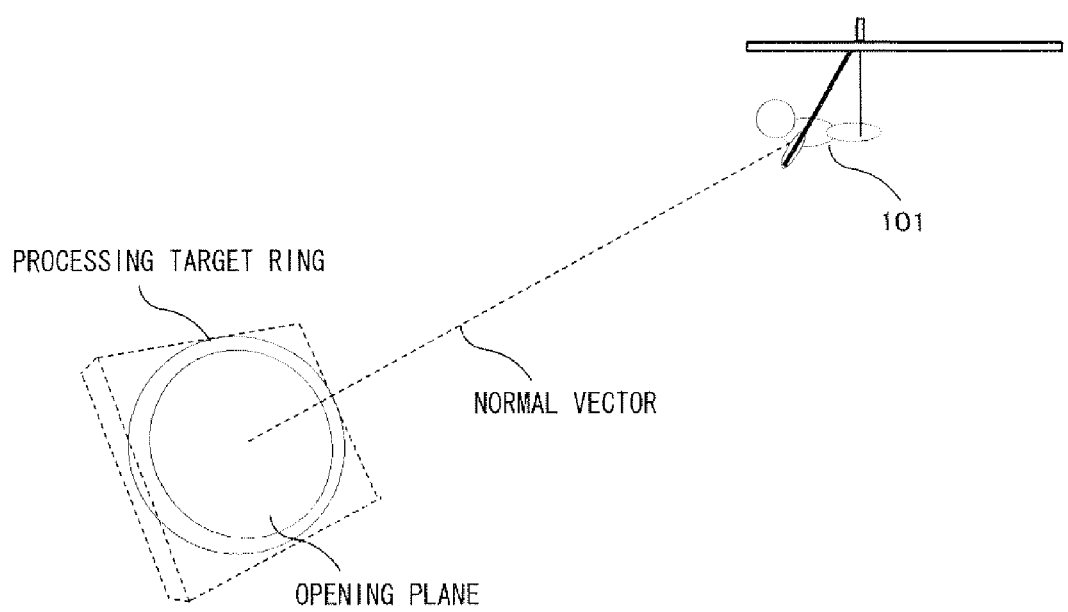
FIG. 9 is a schematic diagram for describing a process of controlling the orientation of the ring object.

Next, at step S7, one of the ring objects 102 detected at step S4 is selected as a processing target ring which is to be subjected to a process described below. If the selection of a processing target ring is made, then at the following step S8, the orientation of the processing target ring, which orientation allows the opening plane of the processing target ring to face the midpoint of the player object 101, is calculated based on the opening plane direction data 331 (i.e., based on the facing direction of the opening plane previously calculated in the processing of the immediately previous frame) and based on the player character current position data 326. Then, the orientation of the processing target ring is changed to the calculated orientation. This process is performed, for example, as follows: first, a normal vector to the opening plane of the processing target ring is calculated as shown in FIG. 9; next, rotation matrix for rotating the processing target ring such that the normal vector is directed to the midpoint of the player object 101 is calculated; and then the processing target ring is rotated based on the rotation matrix. Here, data indicative of the facing direction of the opening plane after the rotation (e.g., data indicative of the direction of the normal vector after the rotation) is stored as the opening plane direction data 331. It should be noted that the above-described manner of performing the process is merely an example. The process may be performed in any manner so long as the orientation of the processing target ring can be controlled such that the opening plane of the processing target ring faces in the direction of the player object 101. Moreover, not only the data indicative of the facing direction of the opening plane but also data indicative of the orientation of the processing target ring may be used as the opening plane direction data 331.

Next, it is determined at step S9 whether there remains, among the ring objects 102 that have been detected, a ring object on which the above-described orientation control process has not yet been performed (i.e., an unprocessed ring object 102). If it is determined that there remains an unprocessed ring object 102 (YES at step S9), the processing returns to step S7. Then, the next processing target ring is selected and the process as described above is performed again.

On the other hand, if there is no unprocessed ring object (NO at step S9), then at step S10, a collision detection process for detecting a collision between a ring object 102 and the player object 101 is performed. The process at step S 10 is described below in detail. First, it is determined whether the player object 101 is being in contact with any ring object 102. If it is determined that the player object 101 is being in contact with a ring object 102, then it is further determined whether the contact by the player object 101 with the ring object 102 has been detected by the "crash-determining collision detection" or the "point-adding collision detection" as shown in FIG. 6. If the player object 101 is determined to be in contact with the body of the ring object 102, processes for a case where the player object 101 has crashed are performed. For example, a process of displaying the crash of the player object 101 and a process of reducing, by 1, the number of remaining hang gliders of the player object are performed. On the other hand, if the contact by the player object 101 with the ring object 102 is detected by the collision detection against the inner-ring portion of the ring object 102, then the player object 101 is determined to have passed through the ring object 102. Accordingly, a process of adding predetermined points to the player is performed. In this case, a process of causing the ring object 102 to disappear is also performed.

Next, at step S11, game processes other than the above-described processes are performed as necessary. Then, at step S12, a game image that shows the virtual game space and that reflects the above-described processes is generated and rendered. As a result, the opening planes of all the ring objects 102 shown in the game image displayed on the screen face in the direction of the player object 101.

Subsequently, it is determined at step S13 whether conditions for ending the game have been satisfied. If it is determined YES at step S13, the game processing ends. On the other hand, if it is determined NO at step S13, the game processing returns to step S2 and the above-described steps are performed again. This is the end of the description of the game processing according to the present embodiment.

As described above, in the present embodiment, a plurality of ring objects 102, which allow the player object 101 to pass through, are placed and controlled such that the opening plane of each ring object 102 always faces in the direction of the player object 101. Therefore, in the game where the player can freely move the player object within the virtual three-dimensional space, the difficulty of the operation of passing the player object through the ring objects 102 is reduced. This enhances the amusement of the game while keeping the difficulty of the game at a moderate level.

Although in the above embodiment the ring objects 102 are described as an example of objects for the player object 101 to pass through. However, the present invention is not limited thereto. The present invention is applicable not only to such a ring-shaped object but also to any object having a different shape so long as the object allows the player object 101 to enter the object or to pass through the object. For example, the object may be a building that is movable and that has an entrance (i.e., an opening) through which the player object 101 can enter the building. The above-described processing may be performed on such an object.

The present embodiment describes, as an example, a game in which the player object 101 passes through the ring objects 102. The present invention is also applicable to other games, for example, a game in which a player is required to control a player object to arrive, collide, or enter a predetermined portion of a target object (e.g., in the above-described embodiment, a ring object).

Although the present embodiment describes, as an example, a ring-shaped object with an opening (ring object 102), the present invention is not limited thereto. The target object need not include an opening. The target object may be a spherical object or cubic object, for example.

The present embodiment describes an example where two types of collision detection are set for the ring object 102. However, the present invention is not limited thereto. The number of types of collision detection may be three or more, or less than two. For example, in the case of the ring object 102 of the present embodiment, only a single type of collision detection, which is crash-determining collision detection, may be provided. In this case, whether the player object 101 has passed through the ring object 102 may be determined in a manner different from collision detection (for example, whether the position of the player object 101 has arrived near the central point of the ring object 102 may be determined). Alternatively, two or more types of collision detection may be set for the inner-ring portion of the ring object. In this case, points added to the player may vary depending on which type of collision detection has detected the player object passing thorough the ring object (for example, higher points may be added if the player object passes through a portion near of the center of the ring object, and lower points may be added if the player object passes through a portion near the edge of the ring object).

Further, in the above embodiment, the facing direction adjustment is performed only on the opening planes of ring objects 102 that are located within the viewing volume of the virtual camera. However, as an alternative, the facing direction adjustment process may be performed on the opening planes of all the ring objects 102 regardless of whether or not they are located within the viewing volume of the virtual camera. Further alternatively, the facing direction adjustment may be performed not on the opening planes of ring objects 102 that are located within the viewing volume of the virtual camera but on the opening planes of ring objects 102 that are located in a predetermined distance range from the position of the player object 101.

An additional process may be performed on a ring object 102, for which the facing direction of the opening plane has been adjusted in the above-described process. The additional process may be performed to display a scene where the ring object 102, for which the facing direction of the opening plane has been adjusted, is making a slight rocking motion. For example, the facing direction of the opening plane may vary once in every second within the range of plus three degrees and minus three degrees around the X-axis. If a variation in the orientation of the ring object 102 is kept to such a small level, there is no major influence on the difficulty for the player to control the player object 101 to pass through the ring object 102. In addition, such a variation in the orientation of the ring object causes a slight motion of the ring object. This allows the player to readily notice the presence of the ring object.

Although the above embodiment describes an example of a flight simulation game for hang gliding, the present invention is applicable to any other game in which a player controls a player object that is allowed to freely move around within a virtual three-dimensional space. For example, the present invention is applicable to a driving game, racing game, etc. Moreover, the present invention is applicable in different fields other than games if they involve controlling an object within a virtual three-dimensional space.

A display control process program for performing processing according to the above-described embodiment, which is typically game processing, may be stored in any computer-readable storage medium (e.g., a flexible disc, hard disk, optical disc, magneto-optical disk, CD-ROM, CD-R, magnetic tape, semiconductor memory card, ROM, RAM, etc).

The above embodiment describes a case where a series of processing for controlling the orientation of ring objects 102 based on the current position of the player object 101 is performed by a single apparatus (i.e., the game apparatus 10). However, in another embodiment, the series of processing may be performed by an information processing system that includes a plurality of information processing apparatuses. For example, in an information processing system that includes a terminal apparatus and a server apparatus capable of communicating with the terminal apparatus via a network, a part of the series of processing may be performed by the server apparatus. Moreover, in an information processing system that includes a terminal apparatus and a server apparatus capable of communicating with the terminal apparatus via a network, the server apparatus may perform main processing among the series of processing and the terminal apparatus may perform other parts of the series of processing. Furthermore, a server system within such an information processing system may include a plurality of information processing apparatuses. Processing performed by the server system may be distributed to the plurality of information processing apparatuses.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein a display control program to be executed by a computer of a display control apparatus configured to cause a player object to move in a virtual three-dimensional space, the display control program causing the computer to perform execution comprising:
   placing at least a player object and a non-player object in the virtual three-dimensional space imaged by at least one virtual camera;
   moving the player object based on an input from an operation device;
   obtaining current position data which indicates the current position, in the virtual three-dimensional space, of the player object which has been moved based on the input from the operation device;
   repeatedly updating data in a memory of the display control apparatus to cause, based on the current position data, a plane of the non-player object to automatically face the current position of the player object when the non-player object is detected as being within a view volume of the at least one virtual camera; and
   generating for display an image representing the virtual three-dimensional space.

2. The non-transitory computer-readable storage medium having the display control program stored therein, according to claim 1, wherein the display control program further causing the computer to perform execution comprising:
   placing at least one object having at least one plane as the non-player object in the virtual three-dimensional space, the non-player object allowing the player object to collide with or pass through the at least one plane, and
   repeatedly updating, based on the current position data, the orientation of the plane of the non-player object such that the plane always faces the current position of the player object.

3. The non-transitory computer-readable storage medium having the display control program stored therein, according to claim 1, wherein the plane is an opening plane.

4. The non-transitory computer-readable storage medium having the display control program stored therein, according to claim 3, wherein
   first collision detection is set for an opening portion of the opening plane of the non-player object, and second collision detection is set for a non-opening portion of the non-player object, and
   the display control program further causes the computer to perform execution comprising:
   determining whether a contact of the player object with the non-player object has been detected by the first collision detection or the second collision detection; and
   performing, based on a result of the determining, a first process in a case where the contact of the player object with the non-player object has been detected by the first collision detection and a second process in a case where the contact of the player object with the non-player object has been detected by the second collision detection, the first process and the second process being different from each other.

5. The non-transitory computer-readable storage medium having the display control program stored therein, according to claim 1, wherein the non-player object is a ring-shaped object.

6. The non-transitory computer-readable storage medium having the display control program stored therein, according to claim 1, wherein when the position of the non-player object satisfies a condition, the orientation of the non-player object is controlled such that the plane of the non-player object faces the current position of the player object.

7. The non-transitory computer-readable storage medium having the display control program stored therein, according to claim 1, wherein the plane of the non-player object is repeatedly updated to face a midpoint of the current position of the player object.

8. The non-transitory computer-readable storage medium having the display control program stored therein, according to claim 1, wherein the display control program further causing the computer to perform execution comprising:
   calculating a normal vector extending from the plane of the non-player object; and
   causing the plane of the non-player object to face the current position of the player object based on the calculated normal vector.

9. The non-transitory computer-readable storage medium having the display control program stored therein, according to claim 1, wherein the display control program further causing the computer to perform execution comprising:
   calculating a normal vector extending from the plane of the non-player object based on a midpoint of the current position of the player object; and
   rotating the plane of the non-player object to face the current position of the player object based on the calculated normal vector extending from the plane of the non-player object.

10. The non-transitory computer-readable storage medium having the display control program stored therein, according to claim 1, wherein the current position data indicates the current position of the player object as three-dimensional coordinates and the plane of the non-player object can be moved, in three dimensions in the virtual three-dimensional space, based on the current position data.

11. The non-transitory computer-readable storage medium having the display control program stored therein, according to claim 1, wherein a period during which a front side of the non-player object faces the current position of the player object is longer than a period during which the front side of the non-player object does not face the current position of the player object.

12. The non-transitory computer-readable storage medium having the display control program stored therein, according to claim 1, wherein the non-player object is rotated so that the plane of the non-player object faces the current position of the player object.

13. The non-transitory computer-readable storage medium having the display control program stored therein, according to claim 1, wherein the player object is configured to pass through the non-player object in the virtual three-dimensional space.

14. The non-transitory computer-readable storage medium having the display control program stored therein, according to claim 1, wherein the virtual three-dimensional space includes a plurality of non-player objects, and the plane of multiple non-player objects of the plurality of non-player objects is caused to face the current position of the player object in the virtual three-dimensional space.

15. The non-transitory computer-readable storage medium having the display control program stored therein, according to claim 1, wherein the virtual three-dimensional space includes a plurality of non-player objects and when one or more of the plurality of non-player objects are detected as being within the view volume of the at least one virtual camera, the plane of the one or more of the plurality of non-player objects are caused to face the current position of the player object in the virtual three-dimensional space.

16. The non-transitory computer-readable storage medium having the display control program stored therein, according to claim 1, wherein the virtual three-dimensional space includes a plurality of non-player objects and all objects, of the plurality of non-player objects, detected as being within the view volume of the at least one virtual camera are caused to have respective planes of the non-player objects face the current position of the player object.

17. The non-transitory computer-readable storage medium having the display control program stored therein, according to claim 1, wherein the player object can simulate flying in the virtual three-dimensional space and the player object is configured to fly towards the non-player object in the virtual three-dimensional space.

18. A display control apparatus comprising at least one processor and configured to cause a player object to move in a virtual three-dimensional space, the apparatus configured to:
   place at least a player object and a non-player object in the virtual three-dimensional space imaged by at least one virtual camera;
   move the player object based on an input from an operation device;
   obtain current position data which indicates the current position, in the virtual three-dimensional space, of the player object which has been moved based on the input from the operation device;
   repeatedly update data in a memory of the display control apparatus to cause, based on the current position data, a plane of the non-player object to automatically face the current position of the player object when the non-player object is detected as being within a view volume of the at least one virtual camera; and
   generate for display an image representing the virtual three-dimensional space.

19. A display control system configured to cause a player object to move in a virtual three-dimensional space, comprising:
   a processing system having at least one processor, the processing system configured to:
      place at least a player object and a non-player object in the virtual three-dimensional space imaged by at least one virtual camera,
      move the player object based on an input from an operation device,
      obtain current position data which indicates the current position, in the virtual three-dimensional space, of the player object which has been moved based on the input from the operation device,
      repeatedly update data in a memory of the display control system to cause, based on the current position data, a plane of the non-player object to automatically face the current position of the player object when the non-player object is detected as being within a view volume of the at least one virtual camera, and generate for display an image representing the virtual three-dimensional space.

20. A display control method, implemented via a display control apparatus, for causing a player object to move in a virtual three-dimensional space, comprising:

placing at least a player object and a non-player object in the virtual three-dimensional space imaged by at least one virtual camera;

moving the player object based on an input from an operation device;

obtaining current position data which indicates the current position, in the virtual three-dimensional space, of the player object which has been moved based on the input from the operation device;

repeatedly updating data in a memory of the display control apparatus to cause, based on the current position data, a plane of the non-player object to automatically face the current position of the player object when the non-player object is detected as being within a view volume of the at least one virtual camera; and generating for display an image representing the virtual three-dimensional space.

* * * * *